United States Patent
Hou et al.

(10) Patent No.: US 10,241,659 B2
(45) Date of Patent: Mar. 26, 2019

(54) METHOD AND APPARATUS FOR ADJUSTING THE IMAGE DISPLAY

(71) Applicant: Tencent Technology (Shenzhen) Company Limited, Shenzhen (CN)

(72) Inventors: Fang Hou, Shenzhen (CN); Yuan Huang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 384 days.

(21) Appl. No.: 14/690,202

(22) Filed: Apr. 17, 2015

(65) Prior Publication Data

US 2015/0220260 A1 Aug. 6, 2015

Related U.S. Application Data

(63) Continuation of application No. PCT/CN2013/083754, filed on Sep. 18, 2013.

(30) Foreign Application Priority Data

Oct. 24, 2012 (CN) .......................... 2012 1 0409949

(51) Int. Cl.
*G06F 3/0484* (2013.01)
*G06F 3/0488* (2013.01)
(Continued)

(52) U.S. Cl.
CPC ........ *G06F 3/04845* (2013.01); *G06F 3/0416* (2013.01); *G06F 3/04883* (2013.01);
(Continued)

(58) Field of Classification Search
CPC ... G09G 2340/0464; G09G 2340/0471; G09G 2340/0478; G09G 2340/0492; G06F 3/04845
See application file for complete search history.

(56) References Cited

U.S. PATENT DOCUMENTS

| 2008/0052945 A1* | 3/2008 | Matas ................... G06F 3/0485 34/173 |
| 2008/0089587 A1* | 4/2008 | Kim ........................ G06F 3/017 382/190 |

(Continued)

FOREIGN PATENT DOCUMENTS

| CN | 201107501 Y | 8/2008 |
| CN | 101551723 A | 10/2009 |

(Continued)

OTHER PUBLICATIONS

University of Salfrod, "Adobe PhotoShop 7.0", 2003, CustomGuide, pp. 1, 2, 124-125.*

(Continued)

*Primary Examiner* — Nicholas Klicos
(74) *Attorney, Agent, or Firm* — Morgan, Lewis & Bockius LLP

(57) ABSTRACT

A method and a computing device for adjusting the display of an image, where the method includes: obtaining, during a process of playing an image, a finger gesture for processing the image; determining whether the finger gesture is a finger gesture for adjusting the image, the adjusting including rotating or flipping; and adjusting the image according to the finger gesture if the finger gesture is a finger gesture for adjusting the image. After it is determined that a finger gesture for processing an image is a finger gesture for adjusting the image, the image is adjusted according to the finger gesture, and during this process, a touch screen device body does not need to be moved, which is a convenient (Continued)

implementing manner; moreover, the image can be rotated or flipped, supporting different operations on the image.

12 Claims, 4 Drawing Sheets

(51) Int. Cl.
    *G06F 3/041*     (2006.01)
    *G09G 5/38*     (2006.01)

(52) U.S. Cl.
    CPC ....... *G09G 5/38* (2013.01); *G09G 2340/0478* (2013.01); *G09G 2340/0492* (2013.01); *G09G 2354/00* (2013.01)

(56) References Cited

U.S. PATENT DOCUMENTS

| | | | |
|---|---|---|---|
| 2008/0122796 A1* | 5/2008 | Jobs | G06F 3/0488 345/173 |
| 2008/0168403 A1* | 7/2008 | Westerman | G06F 3/04883 715/863 |
| 2009/0021475 A1* | 1/2009 | Steinle | G06F 19/3406 345/156 |
| 2009/0079700 A1* | 3/2009 | Abernathy | G06F 3/04883 345/173 |
| 2009/0228841 A1* | 9/2009 | Hildreth | G06F 3/0304 715/863 |
| 2009/0303231 A1* | 12/2009 | Robinet | G06F 3/04815 345/419 |
| 2010/0031203 A1* | 2/2010 | Morris | G06F 3/04883 715/863 |
| 2010/0097338 A1* | 4/2010 | Miyashita | G06F 3/04883 345/173 |
| 2010/0162181 A1* | 6/2010 | Shiplacoff | G06F 3/0485 715/863 |
| 2010/0171712 A1* | 7/2010 | Cieplinski | G06F 3/04883 345/173 |
| 2010/0271301 A1 | 10/2010 | Ohshita et al. | |
| 2010/0295805 A1* | 11/2010 | Shin | G06F 3/04883 345/173 |
| 2010/0306261 A1* | 12/2010 | Geisner | G06F 3/011 707/776 |
| 2011/0074830 A1* | 3/2011 | Rapp | G06F 3/04883 345/677 |
| 2011/0164029 A1* | 7/2011 | King | G06F 3/04883 345/419 |
| 2011/0181524 A1* | 7/2011 | Hinckley | G06F 3/04883 345/173 |
| 2011/0267262 A1 | 11/2011 | Gollier | |
| 2012/0120002 A1* | 5/2012 | Ota | G06F 3/044 345/173 |
| 2012/0249741 A1* | 10/2012 | Maciocci | G06F 3/011 348/46 |
| 2012/0293456 A1* | 11/2012 | Ikeda | G06F 1/1626 345/174 |
| 2012/0317521 A1* | 12/2012 | Ludwig | G06F 3/04883 715/863 |
| 2013/0005420 A1* | 1/2013 | Ueno | A63F 9/0826 463/9 |
| 2013/0009869 A1* | 1/2013 | Wilensky | G06F 3/04845 345/156 |
| 2013/0235071 A1* | 9/2013 | Ubillos | G06F 3/0484 345/600 |
| 2014/0208248 A1* | 7/2014 | Davidson | G06F 3/0487 715/766 |
| 2014/0300569 A1* | 10/2014 | Matsuki | G06F 3/041 345/173 |

FOREIGN PATENT DOCUMENTS

| | | |
|---|---|---|
| CN | 101907969 A | 12/2010 |
| CN | 101917582 A | 12/2010 |
| CN | 101950220 A | 1/2011 |
| CN | 102023788 A | 4/2011 |
| CN | 102033684 A | 4/2011 |
| CN | 103257811 A | 8/2013 |

OTHER PUBLICATIONS

Tencent Technology, ISRWO, PCT/CN2013/083754, dated Dec. 26, 2013, 9 pgs.

Tencent Technology, IPRP, PCT/CN2013/083754, dated Apr. 28, 2015, 7 pgs.

* cited by examiner

METHOD AND APPARATUS FOR ADJUSTING THE IMAGE DISPLAY

RELATED APPLICATIONS

This patent application is a continuation application of PCT Patent Application No. PCT/CN2013/083754, entitled "METHOD AND DEVICE FOR IMPLEMENTING VIDEO IMAGE ROTATION" filed on Sep. 18, 2013, which claims priority to Chinese Patent Application No. 201210409949.8, entitled "METHOD AND DEVICE FOR IMPLEMENTING VIDEO IMAGE ROTATION" filed with Chinese Patent Office on Oct. 24, 2012, both of which are incorporated herein by reference in their entirety.

FIELD OF THE TECHNOLOGY

The present disclosure relates to the field of communication technologies, and in particular, to a method and a computing device for adjusting the display of an image based on a finger gesture.

BACKGROUND OF THE DISCLOSURE

With popularity of touch screen devices such as iPhone, iPod touch, iPad, android mobile phones and android tablets, touch screen operations gradually become popular and accustomed operation manners, and playing video on touch screen devices is increasingly favored by people. When video is played on a touch screen device, image can be rotated.

Currently, a method of adjusting the display of an image is as follows: obtaining, during a process of playing an image, moving information of a touch screen device body; and rotating, according to the moving information of the touch screen device body, the image.

However, the existing technology has at least the following problems: in the existing technology, an image is rotated according to moving information of a touch screen device body, so the touch screen device body must be moved when image adjustment is required, which involves a complicated operation; moreover, in the existing technology, adjusting the display of an image supports only the operation of rotating the image.

SUMMARY

One aspect of the present disclosure provides a method for adjusting the display of an image at a computing device having a processor, a touch screen and memory for storing one or more program modules to be executed by the processor, including: detecting a finger gesture on the touch screen while displaying an image on the touch screen, the finger gesture including a finger gesture starting position on the touch screen and a finger gesture ending position on the touch screen; determining an image operation based on the finger gesture starting position and the finger gesture ending position; generating a new image by performing the image operation to the image; and dynamically replacing the display of the image with the display of the new image on the touch screen.

Another aspect of the present disclosure provides a computing device, including: a processor; a touch screen; memory; and one or more program modules stored in the memory and to be executed by the processor, wherein the one or more program modules further include instructions for: detecting a finger gesture on the touch screen while displaying an image on the touch screen, the finger gesture including a finger gesture starting position on the touch screen and a finger gesture ending position on the touch screen; determining an image operation based on the finger gesture starting position and the finger gesture ending position; generating a new image by performing the image operation to the image; and dynamically replacing the display of the image with the display of the new image on the touch screen.

Yet another aspect of the present disclosure provides a non-transitory computer readable medium storing one or more program modules, wherein the one or more program modules, when executed by a computing device having a processor and a touch screen, cause the computing device to perform the following operations: detecting a finger gesture on the touch screen while displaying an image on the touch screen, the finger gesture including a finger gesture starting position on the touch screen and a finger gesture ending position on the touch screen; determining an image operation based on the finger gesture starting position and the finger gesture ending position; generating a new image by performing the image operation to the image; and dynamically replacing the display of the image with the display of the new image on the touch screen.

According to the technical solutions provided by embodiments of the present invention, after it is determined that a finger gesture for processing an image is a finger gesture for adjusting the image, the image is adjusted according to the finger gesture, and during this process, a touch screen device body does not need to be moved, which is a convenient implementing manner; moreover, the image can be rotated or flipped, supporting different operations on the image.

BRIEF DESCRIPTION OF THE DRAWINGS

To describe the technical solutions of the embodiments of the present invention more clearly, the following briefly introduces the accompanying drawings required for describing the embodiments. Apparently, the accompanying drawings in the following description show only some embodiments of the present invention, and a person of ordinary skill in the art may still derive other drawings from these accompanying drawings without creative efforts.

DESCRIPTION OF EMBODIMENTS

To make objectives, technical solutions and advantages of the present disclosure clearer, the implementation manners of the present disclosure are described in further detail with reference to the accompanying drawings in the following.

Embodiment 1

Figure 1:
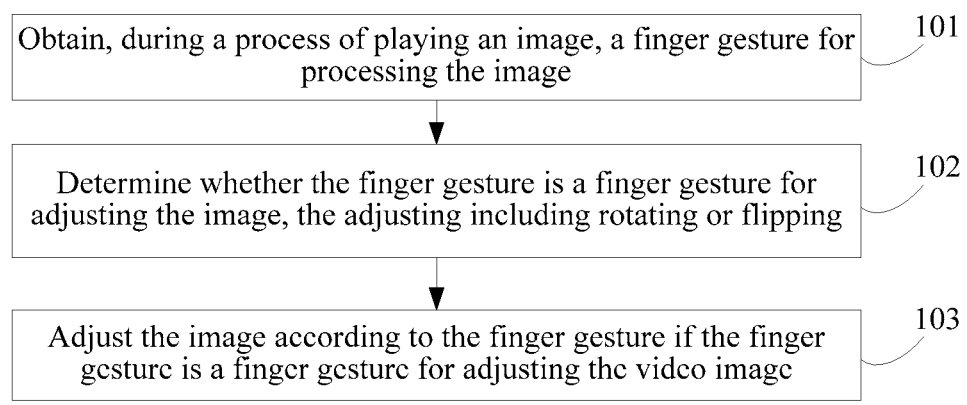
FIG. 1 is a flowchart of a method for adjusting the display of an image provided by Embodiment 1 of the present invention.

This embodiment provides a method for adjusting the display of an image at a computing device having a processor, a touch screen and memory for storing one or more program modules to be executed by the processor. Referring to FIG. 1, the method includes:

Step 101: Obtain, during a process of playing an image, a finger gesture for processing the image Step 102: Determine whether the finger gesture is a finger gesture for adjusting the image, the adjusting including rotating or flipping; and Step 103: Rotate the image according to the finger gesture if the finger gesture is a finger gesture for adjusting the image.

In some embodiments, the computing device detects the finger gesture on the touch screen while displaying an image on the touch screen, the finger gesture including a finger gesture starting position on the touch screen and a finger gesture ending position on the touch screen. The computing device determines an image operation based on the finger gesture starting position and the finger gesture ending position and generates a new image by performing the image operation to the image. The new image may be generated from rotating the current image by a certain angle or flipping the current image horizontally or vertically. Next, the computing device dynamically replaces the display of the image with the display of the new image on the touch screen.

Optionally, the obtaining a finger gesture for processing the image includes: obtaining the finger gesture for processing the image, and determining whether the finger gesture is a single-finger gesture, a double-finger gesture or a more-than-double-finger gesture.

Optionally, the determining, when the finger gesture is the single-finger gesture, whether the finger gesture is a finger gesture for adjusting the image includes: calculating a speed of the single-finger gesture; judging whether the speed of the single-finger gesture is in a predetermined image adjustment operation speed range; and determining that the single-finger gesture is a single-finger gesture for adjusting the image if the speed of the single-finger gesture is in the predetermined image adjustment operation speed range.

Optionally, the adjusting the image according to the finger gesture if the finger gesture is a finger gesture for adjusting the image includes: calculating an angle of the single-finger gesture if the finger gesture is a single-finger gesture for adjusting the image; and adjusting, based on a predetermined relation between the angle of the single-finger gesture and image adjustment, the image according to the calculated angle of the single-finger gesture.

Figure 4:
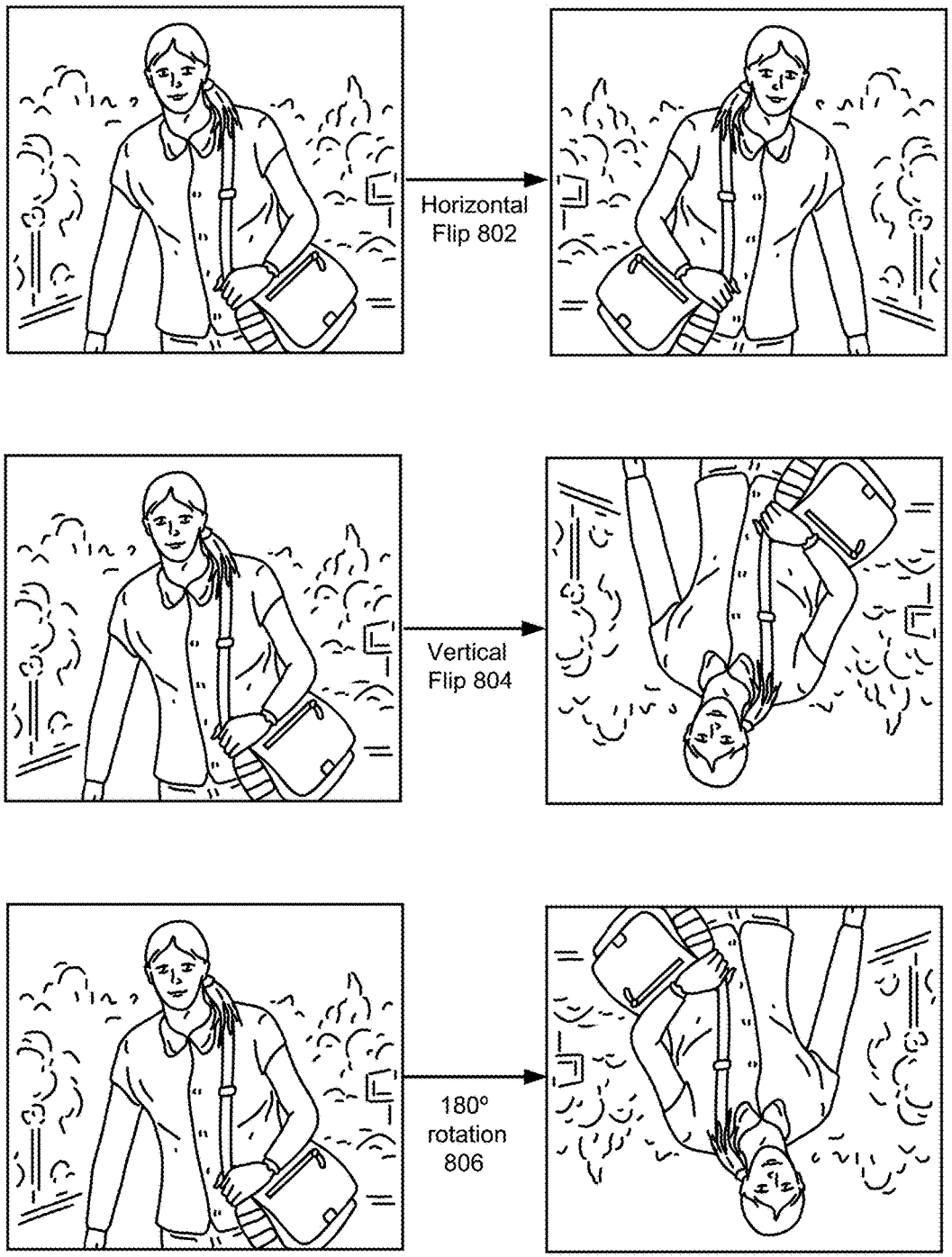
FIG. 4 is schematic structural diagram illustrating a horizonal flip of an image, a vertical flip of the image, and a 180° rotation of the image provided by Embodiment 2 of the present invention.

In some embodiments, the computing device calculates a speed and an orientation (e.g., angle) of the single-finger gesture based on the finger gesture starting position and the finger gesture ending position and an associated finger travel time. When the speed and orientation of the single-finger gesture satisfy a first set of conditions, the computing device horizontally flips the image to the new image (see, e.g., horizontal flip 802 in FIG. 4). When the speed and orientation of the single-finger gesture satisfy a second set of conditions, the computing device vertically flips the image to the new image (see, e.g., vertical flip 804 in FIG. 4). When the speed and orientation of the single-finger gesture satisfy a third set of conditions, the computing device clockwise rotates the image to the new image (see, e.g., 180° rotation 806 in FIG. 4). When the speed and orientation of the single-finger gesture satisfy a third set of conditions, the computing device counterclockwise rotates the image to the new image.

Optionally, the adjusting, based on a predetermined relation between the angle of the single-finger gesture and image adjustment, the image according to the calculated angle of the single-finger gesture further includes: determining, according to the angle of the single-finger gesture, to rotate or flip the image.

Optionally, the determining, when the finger gesture is the double-finger gesture, whether the finger gesture is a finger gesture for adjusting the image includes: if the two fingers slide up or down or left or right simultaneously, or if one of the two fingers holds still, and the other finger moves, determining that the double-finger gesture is a double-finger gesture for adjusting the image.

Optionally, the adjusting the image according to the finger gesture if the finger gesture is a finger gesture for adjusting the image includes: calculating an angle of the double-finger gesture if the finger gesture is a double-finger gesture for adjusting the image; and adjusting, based on a predetermined relation between the angle of the double-finger gesture and image adjustment, the image according to the calculated angle of the double-finger gesture.

Optionally, the adjusting, based on a predetermined relation between the angle of the double-finger gesture and image adjustment, the image according to the calculated angle of the double-finger gesture further includes: determining, according to the angle of the double-finger gesture, to rotate or flip the image.

According to the method for adjusting the display of an image provided by this embodiment of the present invention, after it is determined that a finger gesture for processing an image is a finger gesture for adjusting the image, the image is adjusted according to the finger gesture, and during this process, a touch screen device body does not need to be moved, which is a convenient implementing manner; moreover, the image can be rotated or flipped, supporting different operations on the image.

Embodiment 2

Figure 2:
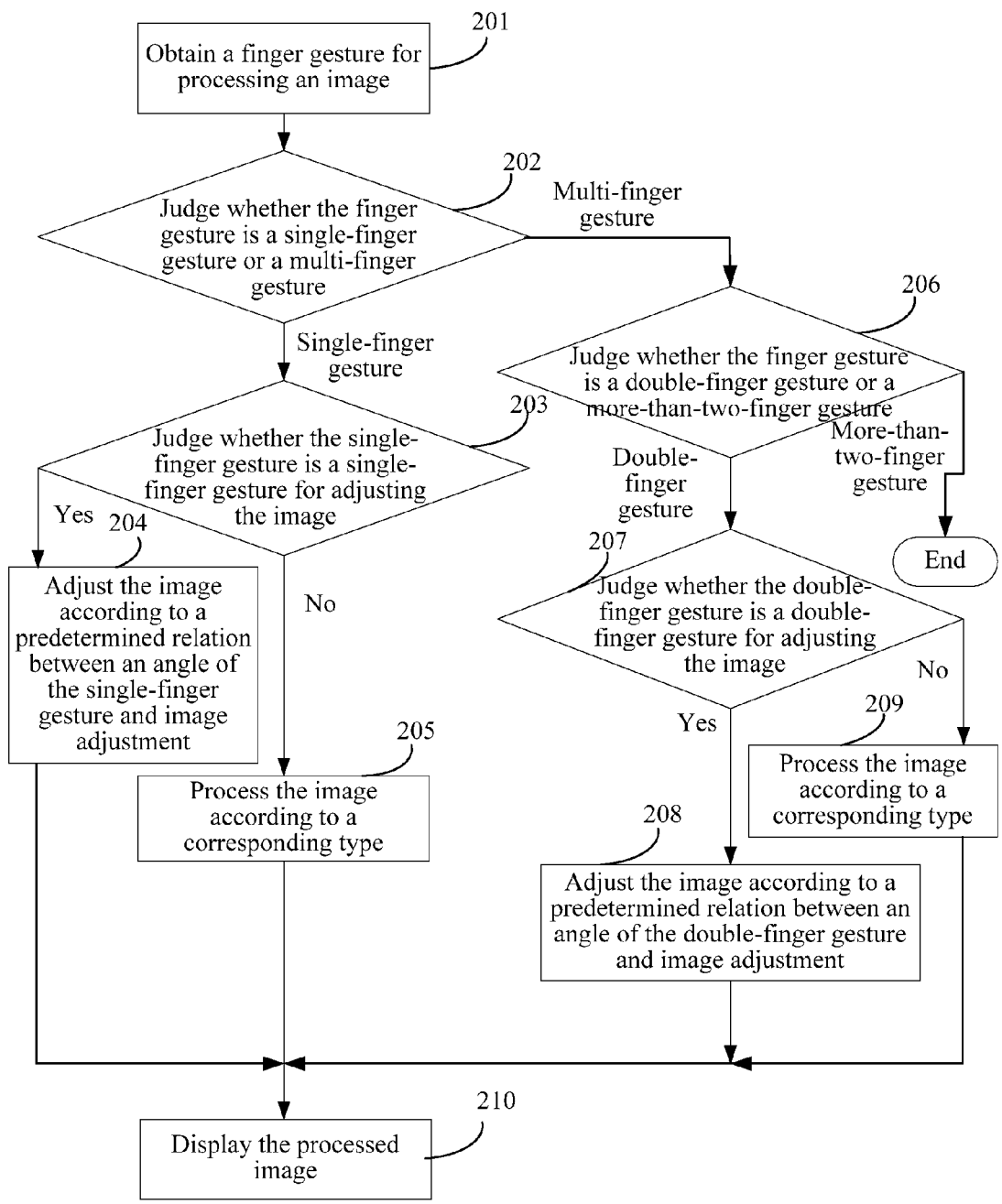
FIG. 2 is a flowchart of a method for adjusting the display of an image provided by Embodiment 2 of the present invention.

This embodiment provides a method for adjusting the display of an image at a computing device having a processor, a touch screen and memory for storing one or more program modules to be executed by the processor. Referring to FIG. 2, the method includes:

Step 201: Obtain, during a process of playing an image, a finger gesture for processing the image.

The finger gesture for processing the image is implemented by a finger touching a touch screen displaying the image.

Specifically, finger gestures for processing the image include a finger gesture for pause the image, a finger gesture for fast-forward the image, a finger gesture for adjusting the image and the like.

Step 202: Judge whether the finger gesture is a single-finger gesture or a multi-finger gesture; if the finger gesture is a single-finger gesture, perform Step 203; if the finger gesture is a multi-finger gesture, perform Step 206.

Step 203: Judge whether the single-finger gesture is a single-finger gesture for adjusting the image; if the single-finger gesture is a single-finger gesture for adjusting the image, perform Step 204; otherwise, perform Step 205.

The adjusting includes rotating or flipping. The rotating is to adjust about a point, which is in one plane, for example, a track formed by a point rotating around another point is a circle (e.g., rotation operation 806, FIG. 4); and flipping is to flip about an axis, which can be understood as spatial (e.g., flipping operations 802 and 804, FIG. 4).

Whether the single-finger gesture is a single-finger gesture for adjusting the image can be judged by factors such as a speed of the single-finger gesture, which is specifically as follows: calculating a speed of the single-finger gesture; judging whether the speed of the single-finger gesture is in a predetermined image adjustment operation speed range; and determining that the single-finger gesture belongs to single-finger gestures for adjusting the image if the speed of the single-finger gesture is in the predetermined image adjustment operation speed range.

The method for calculating the speed of the single-finger gesture is as follows: assume that coordinates of a point P1 where a single finger touches a touch screen is (x1, y1), and time is t1 at this moment; assume that coordinates of a point P2 where a single finger leaves a touch screen is (x2, y2), and time is t2 at this moment; from the single finger touching the touch screen to the single finger leaving the touch screen, a distance S that the single finger moves is a distance between P1 and P2, where $S=\sqrt{(x2-x1)^2+(y2-y1)^2}$, and time from the single finger touching the touch screen to the single finger leaving the touch screen is $t=(t2-t1)$; as such, the speed of the single-finger gesture is $v=S/t$.

The predetermined image adjustment operation speed range may be set according to an actual application situation, for example, a range of greater than or equal to 7 cm/s, or a range of greater than or equal to 7 cm/s and less than or equal to 10 cm/s and the like, which is not specifically limited herein.

In addition, it should be noted that, whether the single-finger gesture is a single-finger gesture for adjusting the image can be judged by any other possible manners in addition to by the speed of the single-finger gesture, which is not limited herein. For example, a single-finger gesture form for adjusting the display of an image may be defined in advance, and whether the single-finger gesture is a single-finger gesture for adjusting the image is judged according to the single-finger gesture form, which is not specifically limited herein, and may be set flexibly according to actual needs.

Step 204: Obtain an angle of the single-finger gesture, and adjust the image according to a predetermined relation between the angle of the single-finger gesture and image adjustment, and then perform Step 210.

An exemplary method for obtaining the angle of the single-finger gesture is as follows: a referenced ray is set in advance. The referenced ray may be set according to actual applications, for example, a line that is parallel to a horizontal direction and is in a direction from left to right is set as the referenced ray, or two points may be selected on the touch screen, and a line connecting one point to the other point is set as the referenced ray. In a word, the referenced line may be set according to actual applications flexibly, which is not limited herein. Assume that coordinates of a point P1 where the single finger touches the touch screen is (x1, y1), coordinates of a point P2 where the single finger leaves the touch screen is (x2, y2), another ray from P1 to P2 is determined, and an angle between the referenced ray and the determined ray from P1 to P2 is taken as the angle A1 of the single-finger gesture.

Specifically, the predetermined relation between the angle of the single-finger gesture and image adjustment in the embodiment of the present invention includes: 165°<A1<195° indicates that the single finger slides left, and the image flips horizontally from right to left (e.g., horizontal flip 802, FIG. 4); −15°<A1<15° indicates that the single finger slides right, and the image flips horizontally from left to right (e.g., horizontal flip 802, FIG. 4); 75°<A1<105° indicates that the single finger slides up, and the image flips vertically from bottom to top (e.g., vertical flip 804, FIG. 4); 255°<A1<285° indicates that the single finger slides down, and the image flips vertically from top to bottom (e.g., vertical flip 804, FIG. 4); 30°<A1<60° indicates that single finger slides in the top-right direction, and the image rotates by 90 degrees clockwise; 120°<A1<150° indicates that the single finger slides in the top-left direction, and the image rotates by 90 degrees counterclockwise; 210°<A1<240° indicates that the single finger slides in the bottom-left direction, and the image rotates by 90 degrees counterclockwise; and 300°<A1<330° indicates that the single finger slides in the bottom-right direction, and the image rotates by 90 degrees clockwise.

Step 205: Judge the type of the single-finger gesture from existing operation types, process the image according to a corresponding type, and then perform Step 210.

Step 206: Judge whether the finger gesture is a double-finger gesture or a more-than-double-finger gesture; if the finger gesture is a double-finger gesture, perform Step 207; if the finger gesture is a more-than-double-finger gesture, end the process.

Step 207: Judge whether the double-finger gesture is a double-finger gesture for adjusting the image; if the double-finger gesture is a double-finger gesture for adjusting the image, perform Step 208; otherwise, perform Step 209.

Specifically, judging whether the double-finger gesture is a double-finger gesture for adjusting the image includes: judging whether the two fingers slide up or down or left or right simultaneously, or whether one of the two fingers holds still, and the other finger moves; and determining that the double-finger gesture is a double-finger gesture for adjusting the image in any of the above two cases.

Step 208: Obtain an angle of the double-finger gesture; adjust the image according to a predetermined relation between the angle of the double-finger gesture and image adjustment, and then perform Step 210.

Specifically, if the double-finger gesture is two fingers sliding up simultaneously, a corresponding angle is set as 90°; if the double-finger gesture is two fingers sliding down simultaneously, a corresponding angle is set as 270°; if the double-finger gesture is two fingers sliding right simultaneously, a corresponding angle is set as 0°; and if the double-finger gesture is two fingers sliding left simultaneously, a corresponding angle is set as 180°.

If the double-finger gesture is one of the two fingers holding static and the other finger moving, coordinates of the finger holding static on the touch screen are set as P1(x1, y1); coordinates of the other finger when the other finger initially touches the touch screen are set as P2 (x2, y2); coordinates of the other finger when the other finger leaves the touch screen are set as P3 (x3, y3); and an angle between a ray P1-P2 and a ray P1-P3 is taken as the angle A2 of the double-finger gesture in this case. The angle A2 of the double-finger gesture in this case is calculated as:

$$A2 = \arccos \frac{(x2-x1)^2 + (y2-y1)^2 + (x3-x1)^2 + (y3-y1)^2 - [(x3-x2)^2 + (y3-y2)^2]}{2*\sqrt{(x2-x1)^2+(y2-y1)^2}*\sqrt{(x3-x1)^2+(y3-y1)}}$$

Specifically, the predetermined relation between the angle of the double-finger gesture and image adjustment in this embodiment of the present invention includes: if the double-finger gesture is two fingers sliding up simultaneously, and the corresponding angle is 90°, the image flips vertically from bottom to top; if the double-finger gesture is two fingers sliding down simultaneously, and the corresponding angle is 270°, the image flips vertically from top to bottom; if the double-finger gesture is two fingers sliding right simultaneously, and the corresponding angle is 0°, the image flips horizontally from left to right; and if the double-finger gesture is two fingers sliding left simultaneously, and the corresponding angle is 180°, the image flips horizontally from right to left. Certainly, this is merely one example, and a person skilled in the art can flexibly set the corresponding relation between the angle of the double-finger gesture and image adjustment according to actual needs, for example, the foregoing corresponding relation between the angle of the single-finger gesture and image adjustment may be applied hereto.

In another aspect, if the double-finger gesture is one of the two fingers holding static and the other finger moving, and the angle A2 is acquired through calculation, the image rotates by A2 degrees in a direction consistent with the clockwise or counterclockwise moving direction of the other finger.

Step 209: Judge of the type of the double-finger gesture from existing operation types, process the image according to a corresponding type, and then perform Step 210.

Step 210: Display the processed image, and then end the process.

According to the method for adjusting the display of an image provided by this embodiment of the present invention, after it is determined that a finger gesture for processing an image is a finger gesture for adjusting the image, the image is adjusted according to the finger gesture, and during this process, a touch screen device body does not need to be moved, which is a convenient implementing manner; moreover, the image can be rotated or flipped, supporting different operations on the image.

Embodiment 3

Figure 3:
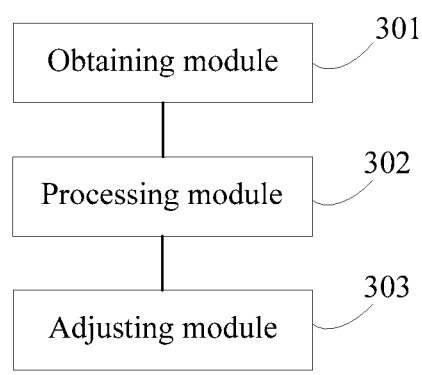
FIG. 3 is schematic structural diagram of a computing device for adjusting the display of an image provided by Embodiment 3 of the present invention.

Referring to FIG. 3, this embodiment provides a computing device for adjusting the display of an image. The computing device typically includes one or more processors, one or more network interfaces, memory, and one or more communication buses for interconnecting these components (sometimes called a chipset). The computing device also includes a user interface that enables presentation of media content, including one or more speakers and/or one or more visual displays (e.g., a touch screen). The user interface also includes one or more input devices, including user interface components that facilitate user input such as a keyboard, a mouse, a voice-command input unit or microphone, a touch sensitive display (e.g., a touch screen), a touch-sensitive input pad, a gesture capturing camera, or other input buttons or controls. Memory includes high-speed random access memory, such as DRAM, SRAM, DDR RAM, or other random access solid state memory devices; and, optionally, includes non-volatile memory, such as one or more magnetic disk storage devices, optical disk storage devices, flash memory devices, or other non-volatile solid state storage devices. Memory, optionally, includes one or more storage devices remotely located from the processor. Memory, or alternately the non-volatile memory device(s) within the memory, includes a non-transitory computer readable storage medium. In some embodiments, the memory, or the non-transitory computer readable storage medium of memory, stores the following programs, modules, and data structures, or a subset or superset thereof.

In some embodiments, the computing device further includes: an obtaining module 301, configured to obtain, during a process of playing an image, a finger gesture for processing the image; a processing module 302, configured to determine, after the obtaining module 301 obtains the finger gesture for processing the image, whether the finger gesture is a finger gesture for adjusting the image, the adjusting including rotating or flipping; and an adjusting module 303, configured to adjust, after the processing module 302 determines the finger gesture is a finger gesture for adjusting the image, the image according to the finger gesture.

Optionally, the obtaining module 301 includes: an obtaining and determining unit, configured to obtain the finger gesture for processing the image, and determine whether the finger gesture is a single-finger gesture, a double-finger gesture or a more-than-double-finger gesture.

The processing module 302 includes: a first calculating unit, configured to calculate, after the obtaining and determining unit obtains the finger gesture for processing the image and determines that the finger gesture is a single-finger gesture, a speed of the single-finger gesture; a first judging unit, configured to judge, after the first calculating unit obtains the speed of the single-finger gesture, whether the speed of the single-finger gesture is in a predetermined image adjustment operation speed range; and a first determining unit, configured to determine, after the first judging unit judges that the speed of the single-finger gesture is in the predetermined image adjustment operation speed range, that the single-finger gesture is a single-finger gesture for adjusting the image.

Optionally, the adjustment module 303 includes: a second calculating unit, configured to calculate, when the finger gesture is a single-finger gesture for adjusting the image, an angle of the single-finger gesture; and a first adjustment unit, configured to adjust, based on a predetermined relation between the angle of the single-finger gesture and image adjustment, the image according to the angle of the single-finger gesture obtained by the second calculating unit.

Optionally, the first adjustment unit is further configured to determine, according to the angle of the single-finger gesture, to rotate or flip the image.

Optionally, the processing module 302 includes: a second judging unit, configured to judge, after the obtaining and determining unit obtains the finger gesture for processing the image and determines that the finger gesture is a double-finger gesture, whether the two fingers slide up or down or left or right simultaneously or whether one of the two fingers holds still and the other finger moves; and a second determining unit, configured to determine, when the second judging unit judges that the two fingers slide up or down or left or right simultaneously or when the second judging unit judges that one of the two fingers holds still and the other finger moves, that the double-finger gesture is a double-finger gesture for adjusting the image.

Optionally, the adjustment module 303 includes: a third calculating unit, configured to calculate, when the finger gesture is a double-finger gesture for adjusting the image, an angle of the double-finger gesture; and a second adjustment unit, configured to adjust, based on a predetermined relation between the angle of the double-finger gesture and image adjustment, the image according to the angle of the double-finger gesture obtained by the third calculating unit.

Optionally, the second adjustment unit is further configured to determine, according to the angle of the double-finger gesture, to rotate or flip the image.

According to the apparatus for adjusting the display of an image provided by this embodiment of the present invention, after it is determined that a finger gesture for processing an image is a finger gesture for adjusting the image, the image is adjusted according to the finger gesture, and during this process, a touch screen device body does not need to be moved, which is a convenient implementing manner; moreover, the image can be rotated or flipped, supporting different operations on the image.

It should be noted that the above functional modules are only described for exemplary purposes in the apparatus for adjusting the display of an image according to the foregoing embodiment. In actual applications, the functions may be allocated to different functional modules according to specific needs, which means that the internal structure of the apparatus is divided to different functional modules to complete all or some of the above described functions. In addition, the apparatus for adjusting the display of an image provided by the foregoing embodiment is based on the same concept as the method for adjusting the display of an image in the foregoing embodiments. For the specific implementation process, refer to the method embodiments, and the details are not described herein again.

The foregoing embodiment numbers of the present invention are merely for descriptive purposes, but do not imply preference to any of the embodiments.

In the embodiments of the present invention, the apparatus for adjusting the display of an image according to the embodiments of the present invention can be constructed and the method for adjusting the display of an image according to the embodiments of the present invention can be implemented by running computer programs (including program code) that can carry out the method for adjusting the display of an image according to the embodiments of the present invention on universal computing devices such as a computer including a Central Processing Unit (CPU), a Random Access Memory (RAM), a Read Only Memory (ROM) and the like. The computer programs may be recorded on a computer readable record medium, and can be loaded on the foregoing computing devices by the computer readable record medium and run on the foregoing computing devices.

The above descriptions are merely preferred embodiments of the present invention, and are not intended to limit the present disclosure. Any modification, equivalent replacement, or improvement made within the spirit and principle of the present disclosure shall fall within the protection scope of the present disclosure.

What is claimed is:

1. A method for adjusting the display of an original image, comprising:
at a computing device having a processor, a touch screen, and memory for storing one or more program modules to be executed by the processor,
displaying the original image on the touch screen at its current orientation including a horizontal axis and a vertical axis, both axes located within the touch screen and perpendicular to each other;
detecting a first single-finger gesture on the touch screen that exceeds a first threshold speed and is less than a second threshold speed, wherein (i) the first threshold speed is greater than zero, and (ii) the first single-finger gesture starts at a first position on the touch screen, continues to a second position, different from the first position, on the touch screen, and ends at the second position on the touch screen;
in response to detecting the first single-finger gesture on the touch screen that is less than the second threshold speed, maintaining the original image on the touch screen at the current orientation;
detecting a second single-finger gesture on the touch screen that exceeds the second threshold speed, wherein the second single-finger gesture also starts at the first position on the touch screen, continues to the second position on the touch screen, and ends at the second position on the touch screen;
in response to detecting the second single-finger gesture on the touch screen that exceeds the second threshold speed:
calculating an orientation of the second single-finger gesture based on the first position and the second position;
in accordance with a determination that the orientation of the second single-finger gesture is within a predefined angular range from the horizontal axis of the current orientation of the original image, dynamically flipping the original image around the vertical axis of the current orientation by 180° to a new image; and
in accordance with a determination that the orientation of the second single-finger gesture is within a predefined angular range from the vertical axis of the current orientation of the original image, dynamically flipping the original image around the horizontal axis of the current orientation by 180° to the new image,
wherein the new image is a mirror image of the original image.

2. The method according to claim 1, wherein:
the original image is flipped to the new image horizontally from left to right when the orientation of the second single-finger gesture is between −15° and 15° of the horizontal axis of the current orientation of the original image; and
the original image is flipped to the new image horizontally from right to left when the orientation of the second single-finger gesture is between 165° and 195° of the horizontal axis of the current orientation of the original image.

3. The method according to claim 1, wherein:
the original image is flipped to the new image vertically from bottom to top when the orientation of the second single-finger gesture is between 75° and 105° of the horizontal axis of the current orientation of the original image; and
the original image is flipped to the new image vertically from top to bottom when the orientation of the second single-finger gesture is between 255° and 285° of the horizontal axis of the current orientation of the original image.

4. The method according to claim 1, wherein the original image is a first image frame of a video and the new image after the flipping is a second image frame of the video that is subsequent to the first image frame.

5. A computing device comprising:
a processor;
a touch screen;
memory; and
one or more program modules stored in the memory and to be executed by the processor, wherein the one or more program modules further include instructions for:
displaying an original image on the touch screen at its current orientation including a horizontal axis and a vertical axis, both axes located within the touch screen and perpendicular to each other;
detecting a first single-finger gesture on the touch screen that exceeds a first threshold speed and is less than a second threshold speed, wherein (i) the first threshold speed is greater than zero, and (ii) the first single-finger gesture starts at a first position on the touch screen, continues to a second position, different from the first position, on the touch screen, and ends at the second position on the touch screen;

in response to detecting the first single-finger gesture on the touch screen that is less than the second threshold speed, maintaining the original image on the touch screen at the current orientation;

detecting a second single-finger gesture on the touch screen that exceeds the second threshold speed, wherein the second single-finger gesture also starts at the first position on the touch screen, continues to the second position on the touch screen, and ends at the second position on the touch screen;

in response to detecting the second single-finger gesture on the touch screen that exceeds the second threshold speed:

calculating an orientation of the second single-finger gesture based on the first position and the second position;

in accordance with a determination that the orientation of the second single-finger gesture is within a predefined angular range from the horizontal axis of the current orientation of the original image, dynamically flipping the original image around the vertical axis of the current orientation by 180° to a new image; and in accordance with a determination that the orientation of the second single-finger gesture is within a predefined angular range from the vertical axis of the current orientation of the original image, dynamically flipping the original image around the horizontal axis of the current orientation by 180° to the new image, wherein the new image is a mirror image of the original image.

6. The computing device according to claim 5, wherein:
the original image is flipped to the new image horizontally from left to right when the orientation of the second single-finger gesture is between −15° and 15° of the horizontal axis of the current orientation of the original image; and
the original image is flipped to the new image horizontally from right to left when the orientation of the second single-finger gesture is between 165° and 195° of the horizontal axis of the current orientation of the original image.

7. The computing device according to claim 5, wherein:
the original image is flipped to the new image vertically from bottom to top when the orientation of the second single-finger gesture is between 75° and 105° of the horizontal axis of the current orientation of the original image; and
the original image is flipped to the new image vertically from top to bottom when the orientation of the second single-finger gesture is between 255° and 285° of the horizontal axis of the current orientation of the original image.

8. The computing device according to claim 5, wherein the original image is a first image frame of a video and the new image after the flipping is a second image frame of the video that is subsequent to the first image frame.

9. A non-transitory computer readable medium storing one or more program modules, wherein the one or more program modules, when executed by a computing device having a processor and a touch screen, cause the computing device to perform the following operations:

displaying an original image on the touch screen at its current orientation including a horizontal axis and a vertical axis, both axes located within the touch screen and perpendicular to each other;

detecting a first single-finger gesture on the touch screen that exceeds a first threshold speed and is less than a second threshold speed, wherein (i) the first threshold speed is greater than zero, and (ii) the first single-finger gesture starts at a first position on the touch screen, continues to a second position, different from the first position, on the touch screen, and ends at the second position on the touch screen;

in response to detecting the first single-finger gesture on the touch screen that is less than the second threshold speed, maintaining the original image on the touch screen at the current orientation;

detecting a second single-finger gesture on the touch screen that exceeds the second threshold speed, wherein the second single-finger gesture also starts at the first position on the touch screen, continues to the second position on the touch screen, and ends at the second position on the touch screen;

in response to detecting the second single-finger gesture on the touch screen that exceeds the second threshold speed:

calculating an orientation of the second single-finger gesture based on the first position and the second position;

in accordance with a determination that the orientation of the second single-finger gesture is within a predefined angular range from the horizontal axis of the current orientation of the original image, dynamically flipping the original image around the vertical axis of the current orientation by 180° to a new image; and in accordance with a determination that the orientation of the second single-finger gesture is within a predefined angular range from the vertical axis of the current orientation of the original image, dynamically flipping the original image around the horizontal axis of the current orientation by 180° to the new image, wherein the new image is a mirror image of the original image.

10. The non-transitory computer readable medium according to claim 9, wherein the original image is a first image frame of a video and the new image after the flipping is a second image frame of the video that is subsequent to the first image frame.

11. The non-transitory computer readable medium according to claim 9, wherein:
the original image is flipped to the new image horizontally from left to right when the orientation of the second single-finger gesture is between −15° and 15° of the horizontal axis of the current orientation of the original image; and
the original image is flipped to the new image horizontally from right to left when the orientation of the second single-finger gesture is between 165° and 195° of the horizontal axis of the current orientation of the original image.

12. The non-transitory computer readable medium according to claim 9, wherein:
the original image is flipped to the new image vertically from bottom to top when the orientation of the second single-finger gesture is between 75° and 105° of the horizontal axis of the current orientation of the original image; and the original image is flipped to the new image vertically from top to bottom when the orientation of the second single-finger gesture is between 255° and 285° of the horizontal axis of the current orientation of the original image.

* * * * *